(12) United States Patent
Fukuoka et al.

(10) Patent No.: US 7,185,171 B2
(45) Date of Patent: Feb. 27, 2007

(54) SEMICONDUCTOR INTEGRATED CIRCUIT

(75) Inventors: Tetsuya Fukuoka, Ome (JP); Takeshi Miyazaki, Akishima (JP); Katsuichi Tomobe, Ome (JP)

(73) Assignee: Hitachi, Ltd., Tokyo (JP)

( * ) Notice: Subject to any disclaimer, the term of this patent is extended or adjusted under 35 U.S.C. 154(b) by 427 days.

(21) Appl. No.: 10/619,463

(22) Filed: Jul. 16, 2003

(65) Prior Publication Data

US 2004/0019762 A1 Jan. 29, 2004

(30) Foreign Application Priority Data

Jul. 25, 2002 (JP) .............................. 2002-216258

(51) Int. Cl.
*G06F 12/00* (2006.01)
(52) U.S. Cl. ..................................................... 711/206
(58) Field of Classification Search ................ 711/202, 711/207, 208; 713/1
See application file for complete search history.

(56) References Cited

U.S. PATENT DOCUMENTS 5,291,445 A * 3/1994 Miyaoka et al. ....... 365/189.08
5,371,880 A * 12/1994 Bhattacharya .............. 713/400
5,860,145 A    1/1999 Nogami
5,883,855 A *  3/1999 Fujita ...................... 365/238.5

FOREIGN PATENT DOCUMENTS

| JP | 0417858 A * | 6/1992 |
| JP | 8-95864 | 9/1994 |
| JP | 11-134256 | 10/1997 |
| JP | 2000-148589 | 11/1998 |
| JP | 2001-22582 | 7/1999 |

* cited by examiner

*Primary Examiner*—Pierre-Michel Bataille
(74) *Attorney, Agent, or Firm*—Reed Smith LLP; Stanley P. Fisher, Esq.; Juan Carlos A. Marquez, Esq.

(57) ABSTRACT

There is provided a semiconductor integrated circuit which assures sufficiently lower power consumption of a translation look-aside buffer without deterioration of operation rate performance thereof.

In the translation look-aside buffer to convert logical address into physical address, a clock enable generating circuit is provided to stop the operation clock to be supplied to the tag memory and entry memory of the translation look-aside buffer while the virtual memory valid bit Vs of the status register indicating access to the virtual memory is "0", or while the cache-stall signal is outputted because of miss-hit in the cache, or when the access is issued with the same logical page address to the area other than the boundary area of the address range.

9 Claims, 8 Drawing Sheets

V-BIT IS 0 IN THE STATUS REGISTER

CACHE-STALL SIGNAL IS HIGH LEVEL

SAME PAGE ADDRESS IS ACCESSED

SEMICONDUCTOR INTEGRATED CIRCUIT

BACKGROUND OF THE INVENTION

The present invention relates to low power consumption technique for semiconductor integrated circuit and more specifically to the technique which may effectively be applied, for example, to an LSI (Large-Scale Integrated circuit) provided with a translation look-aside buffer memory used for virtual memory and an LSI including a processor core of the VLIW (Very Long Instruction Word) system.

In general, a processor which processes a large amount of data supports virtual memory. The virtual memory means the technique to show the limited address space for main memory as if it were provided with a vast address space in the main memory such as DRAM (Dynamic Random Access Memory) and the system including the secondary memory such as hard disk by providing a wide storage area for virtual memory in the secondary memory and allowing a processor to make access to the main memory by transferring a part of the data under the access request in this storage area to the main memory.

Since access is made from a processor using a virtual logical address in order to use virtual memory, this logical address must be converted to a physical address on the main memory. Moreover, since this address conversion has to be executed for each access to the virtual memory, a processor supporting the virtual memory is generally provided with a memory circuit called a translation look-aside buffer (TLB) which assures high speed address conversion for alleviation of overhead in the performance through the address conversion.

One of the processor architectures is called the VLIW system in which a plurality of execution circuits assuring parallel operations are provided to receive the instruction in which a plurality of instruction codes are combined and a plurality of execution circuits process in parallel a plurality of instruction codes. In the VLIW system processor architecture, the hardware is not required to judge possibility of simultaneous execution of each instruction code and the processor can obtain high throughput through the parallel processes only by sending, for the purpose of processing, a plurality of instruction codes included in one instruction to each execution circuit corresponding to the format thereof.

In this VLIW system, when the number of instruction codes to be executed simultaneously is comparatively small, it is require to attain the matching of instruction length by inserting the code of NOP (Non Operation) instruction which is not accompanied by effective processes. Moreover, the processors of VLIW system include the processor which compresses the instruction by adding instruction location information indicating the information of group boundary of instruction codes executed simultaneously and the format of each instruction code in place of eliminating the NOP instruction inserted to attain the matching of instruction length and then recovers this compressed instruction to the original instruction within the processor in order to execute the decoding process and execution process. With such compressed instruction, efficiency of instruction cache can be improved.

At present, power consumption of LSI is more increasing as the operation rate of LSI is improved and the integration density is enhanced. Moreover, since the LSI is often loaded to electronic devices which are driven with batteries such as portable phones and personal digital assistants (PDA), requirement for reduction in power consumption of LSI is more and more growing.

Accordingly, the inventors of the present invention have investigated reduction in power consumption of the translation look-aside buffer and processor of VLIW system described above.

As the prior art for realizing low power consumption of the translation look-aside buffer, the similar techniques have been disclosed respectively, for example, in the Japanese Patent Laid-Open Nos. Hei 11(1999)-134256, Hei 8(1996)-95864 and 2000-148589.

The technique of the Japanese Patent Laid-Open No. Hei 11(1999)-134256 realizes low power consumption by comparing the upper bits of the logical address with the preceding upper bits before the address conversion and then realizing the address conversion, when the upper bits are matched, using the preceding conversion result without execution of address conversion in the translation look-aside buffer.

In addition, the technique disclosed in the Japanese Patent Laid-Open No. Hei 8(1996)-95864 realizes low power consumption by comparing the upper bits (virtual page number) of logical address with the preceding upper bits before the address conversion and then setting, when the matching is attained, the translation look-aside buffer to non-active state using the preceding conversion result.

The technique disclosed in the Japanese Patent Laid-Open No. 2000-148589 realizes low power consumption by controlling the operation in such manner that only one translation look-aside buffer among those provided in a memory management unit is always operated.

SUMMARY OF THE INVENTION

Among the prior arts described above, the technique disclosed in the Japanese Patent Laid-Open No. Hei 11(1999)-134256 is intended to reduce power consumption by the address converting operation and is yet insufficient because power consumption by the translation look-aside buffer is not reduced while it is in the waiting condition. In general, the translation look-aside buffer is configured in the same manner as a cache memory which assures high speed operation and its electrical power consumption in the waiting condition cannot be neglected as will be described later in detail.

Moreover, the technique disclosed in the Japanese Patent Laid-Open No. Hei 8(1996)-95864 realizes low power consumption by setting the translation look-aside buffer to non-active state. However, low power consumption is realized only in the period where the upper bits of logical address (virtual page number) are matched with the preceding upper bits and it can also be considered to further reduce power consumption in the other periods. In addition, this technique has proved that the timing required for address conversion increases and such increase of timing causes deterioration of high speed operation characteristic because the upper bits of logical address are compared with the preceding upper bits and the translation look-aside buffer is activated, when the upper bits are not matched, to start the address conversion operation. Since the path of translation look-aside buffer is generally critical, increase of timing in the translation look-aside buffer will result in deterioration of the processing rate of system.

Moreover, a technique disclosed in Japanese Patent Laid-Open No. 2001-22582 is the prior art for reducing power consumption of a processor core. This cited reference discloses the technique to realize low power consumption by outputting, when a non-related instruction is inputted, the NOP instruction, in place of this instruction, to the register of instruction code and decoder and by stopping the clock to be inputted to the register of instruction code.

However, even when these prior arts have been considered, it has been proved that unwanted power consumption is still generated because the decoding circuit and execution circuit operate for the NOP instruction as in the case of the other instruction when this NOP instruction is sent to these circuits. Moreover, it has also been thought that when the instruction code is compared and detected to know it is not related or not and the operation is controlled to realize low power consumption when the instruction code is proved as the non-related instruction code, adverse effects are generated in the processing rate of processor, for example, increase of timing for comparison and detection of such instruction code becomes a bottle-neck of the processing rate of processor and thereby operation frequency cannot be increased sufficiently or the number of steps required for processes of processor increases.

An object of the present invention is to provide a semiconductor integrated circuit which has realized sufficient low power consumption for translation look-aside buffer without deterioration of operation rate performance of the translation look-aside buffer. Moreover, it is also an object of the present invention to provide a semiconductor integrated circuit which has realized sufficient low power consumption for processor core of the VLIW system without influence on the processing rate of processor.

The aforementioned and the other objects and novel features of the present invention will become apparent from the description of this specification and the accompanying drawings.

The typical inventions of the present invention disclosed in this specification will be summarized below.

Namely, during the period of physical memory access mode in which no access is made to the virtual memory and during the update of cache data due to miss-hit of cache, or when the access is made in the same logical page address and moreover to the area other than the boundary of address range thereof, at least a tag memory area and an entry memory area of the translation look-aside buffer are set to non-active state by, for example, suspending the operation clock. With the means (ex. switching circuit) described above, low power consumption of translation look-aside buffer can be realized without deterioration of operation rate performance thereof.

In addition, the semiconductor integrated circuit of the present invention detects the area where the NOP instruction is inserted based on the instruction location information to the processing stage to recover the compressed instruction in the processor core of the VLIW system having the function to recover the compressed instruction and sets the decoding circuit and execution circuit corresponding to such area to the non-active state by suspending, for example, the operation clock. According to the means described above, low power consumption of processor core may be realized without deterioration of processing rate of processor.

DETAILED DESCRIPTION OF THE PREFERRED EMBODIMENTS

The preferred embodiments of the present invention will be described below with reference to the accompanying drawings.

[First Embodiment]

Figure 1:
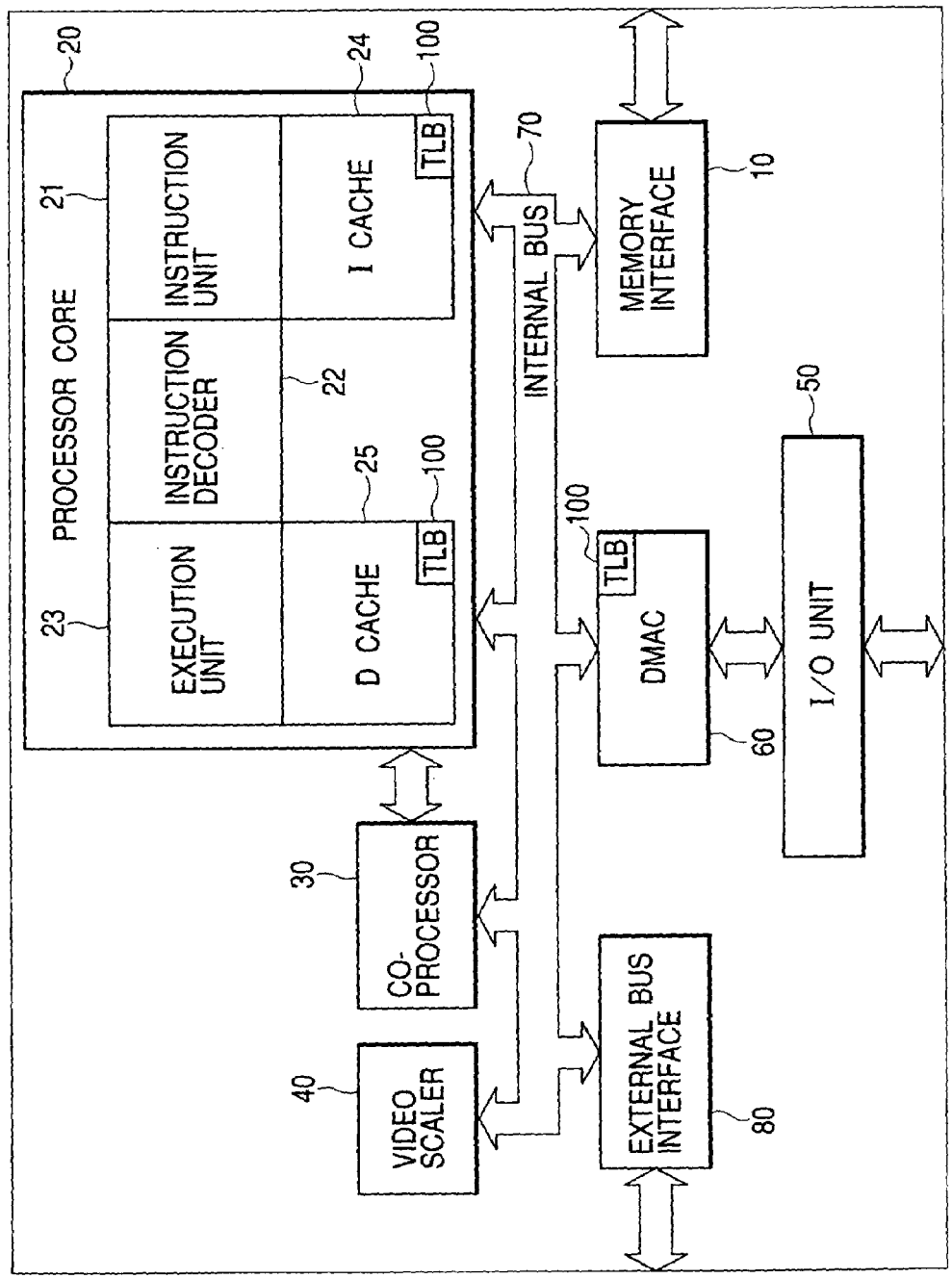
FIG. 1 is a block diagram illustrating the total structure of a system LSI as an embodiment of the present invention.

FIG. 1 is a block diagram illustrating the total structure of a system LSI having loaded a processor core of an embodiment of the present invention.

The system LSI of this embodiment is loaded, although not particularly restricted, for example, to a portable electronic device to totally control the system and to perform data process or the like of moving picture. This system LSI comprises a processor core 20 to execute programs, a memory interface 10 to execute data access control to the main memory such as externally connected SDRAM (Synchronous DRAM) or the like, a processor 30 to execute arithmetic process required for encoding and decoding of the moving picture data, a video scaler 40 to execute data process required for expansion and compression of side of the moving picture, an IO unit 50 to exchange data with an externally connected input/output device, a DMA (Direct Memory Access) controller 60 to enable, to the processor core 20, direct data access between peripheral module and main memory by no means of data, an internal bus 70 used for data transfer among modules, and an external bus interface 80 to exchange data between the external bus connected to peripheral devices such as communication module and large capacity memory and the internal bus 70.

The processor core 20 described above is of the instruction control system of VLIW and may be used for the compressed instruction in which the location information of each instruction is added in place of eliminating the NOP instruction from the instruction of VLIW. This processor core 20 comprises an instruction cache (hereinafter, abbreviated as I cache) 24 to reach the compressed instruction, an instruction unit 21 to recover the instruction by expanding the compressed instruction, an instruction decoder 22 including a plurality of decoding circuits to respectively decode a plurality of instruction codes which are included in one instruction and are processed simultaneously, an execution unit 23 including a plurality of execution circuits to perform arithmetic process respectively for a plurality of instruction codes, and a data cache (hereinafter, abbreviated as D cache) 25 to read and write the arithmetic data and result data.

The system LSI of this embodiment is capable of using a virtual memory providing a virtual address space wider than the physical address space assigned to the main memory by utilizing a large capacity memory device such as hard disk connected to the external bus. In order to realize such function of the virtual memory, the module for data access to virtual memory (I cache 24, D cache 25, DMA controller 60) is respectively provided with a translation look-aside buffer 100 to convert the logical address on the virtual memory to the physical address of the main memory.

Figure 2:
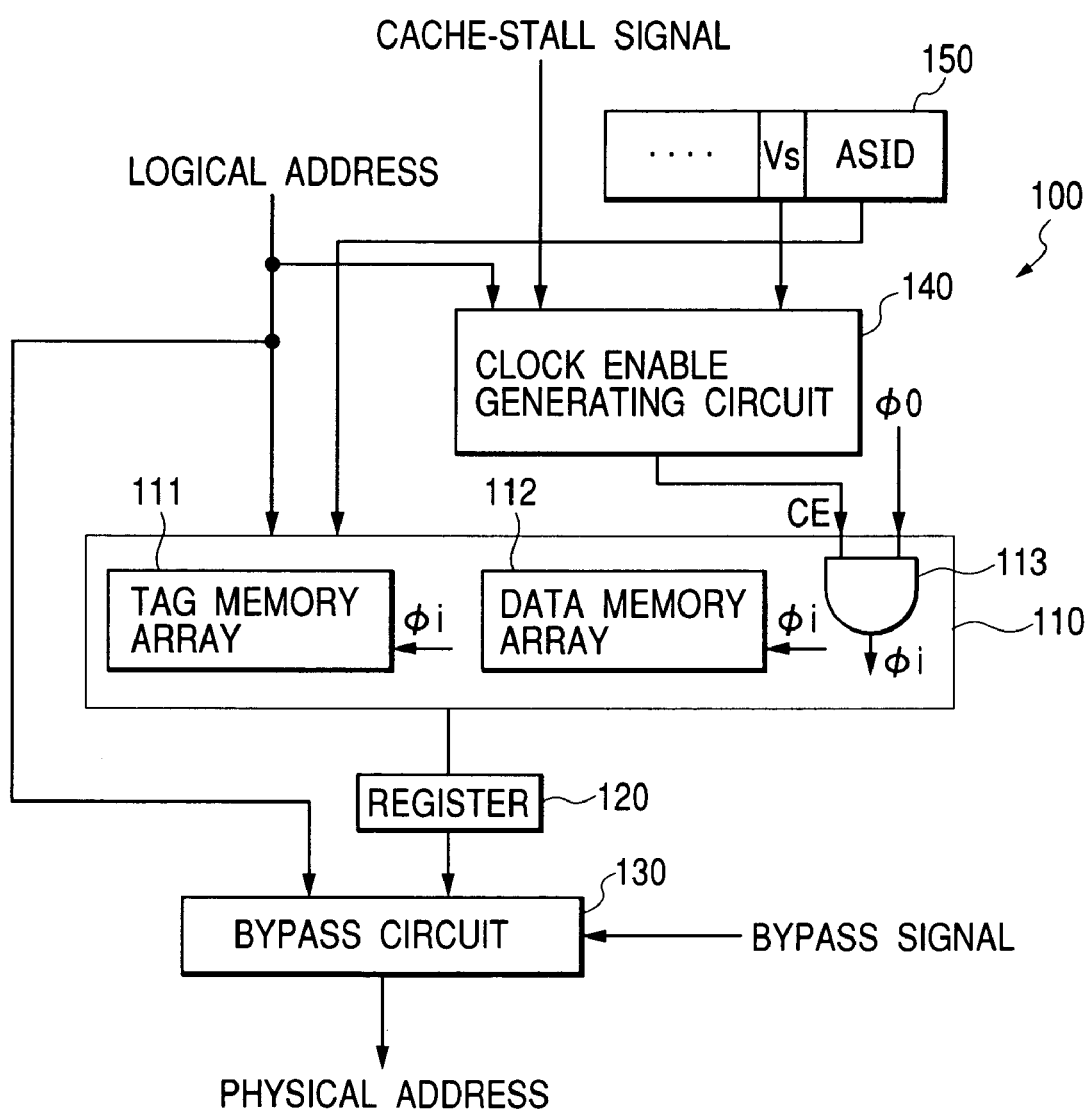
FIG. 2 is a block diagram illustrating structures of a translation look-aside buffer comprised in the system LSI and the peripheral circuit thereof.

FIG. 2 illustrates a block diagram of the translation look-aside buffer and its peripheral portion.

The translation look-aside buffer 100 divides the logical address on the virtual memory into the predetermined number of upper bits (called the logical page address) and the remaining lower bits (called the intra-page address), converts this logical page address to the page address of corresponding physical address (called the physical page address), and causes access to the main memory using the combined address of the physical page address and the remaining intra-page address as the physical address after the conversion. This translation look-aside buffer 100 can use the virtual address spaces by multiplexing these spaces and is configured to select only one virtual address space among those which are multiplexed based on the space identifier ASID which is set separately and to make access to the virtual memory using such virtual address space. This multiplexing technique is already apparent.

This translation look-aside buffer 100 is further provided with a TLB main unit 110 for converting the input logical page address to the corresponding physical page address, an output register 120 for holding physical page address output from the TLB main unit 110, a bypass circuit 130 for selectively outputting any one of the physical page addresses held in the logical page address or register 120, a clock enable generating circuit 140 for a clock enable signal to allow or inhibit the supply of the internal clock ϕi of the TLB main unit 120, and a status register 150 or the like for storing the space identifier ASID to select any one of the multiplexed virtual address spaces and virtual memory valid bit Vs indicating use of the virtual memory or the like.

The TLB main unit 110 has the structure similar to the existing configuration comprising a tag memory 111 for storing the space identifier ASID and logical page address as the tag (TAG) information, a data memory 112 for storing the physical page address as the entry information, and a tag information comparing/judging circuit, not illustrated, to judge the matching by comparing the input space identifier ASID and logical page address with the tag information and is also additionally provided with a gated clock circuit 113 or the like for supplying and cutting off the clock 4i to the tag memory 111 and data memory 112. Moreover, the tag memory 111 is provided with valid bit which indicate validity or invalidity of every data entry to which the space identifier ASID and logical page address are stored one by one and accordingly the data entry having the bits indicating validity is considered as the object of comparison and judgment.

The space identifier ASID and valid bit Vs of a status register 150 are updated as required depending on the software process of the program or OS (Operating System) being executed by the processor core 20. Moreover, the valid bit Vs is always set to "0" when the virtual memory is not used but is updated to "1" when the virtual memory is used and the access is issued from the OS or the like to the development area of the virtual memory in the main memory. In other case, when the access is generated to the ordinary storage area in the main memory, it is then updated to "0".

Moreover, a bypass signal which determines the selected path of the bypass circuit 130 is set to the low level at the rising edge of the next clock signal ϕ0 when the virtual memory valid bit Vs of the status register 150 is switched to "0" with a logical combination circuit not illustrated and is set to the high level at the rising edge of the next clock signal ϕ0 when the virtual memory valid bit Vs is switched to "1" to select the path in the side of the register 120.

Figure 3:
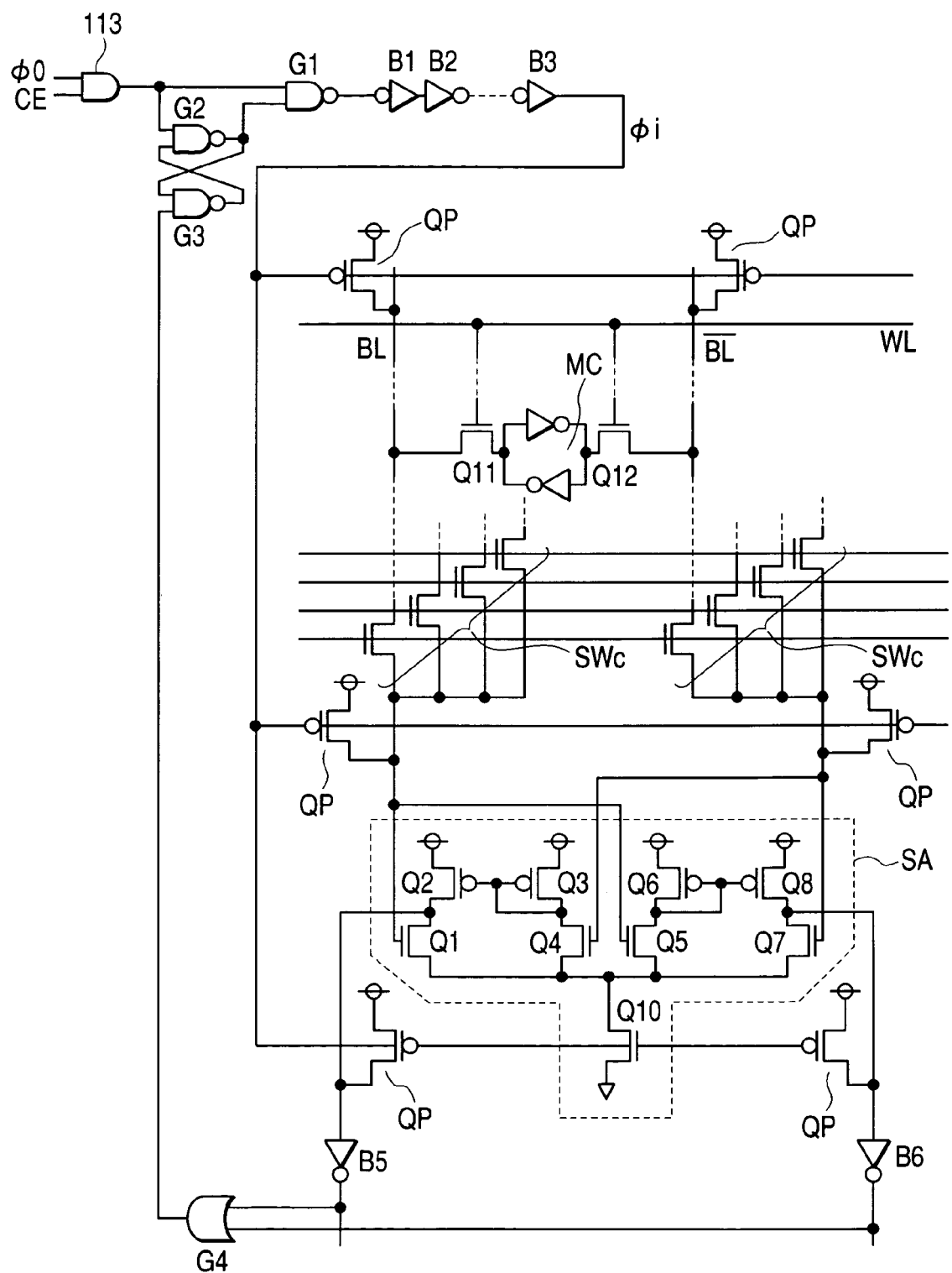
FIG. 3 is a circuit diagram illustrating partial memory structures of a TAG memory and a data memory of the translation look-aside buffer.

FIG. 3 illustrates a part of the structural example of the tag memory and data memory.

The tag memory 111 and data memory 112 of this embodiment are composed of SSRAM (Synchronous Static Random Access Memory) as partially illustrated in FIG. 3. The SSRAM is provided with a memory cell formed of four elements, a word line WL to select a memory cell, a pair of bit lines BL, /BL to read stored data from the memory cell MC, a column switch SWc to select output data depending on Y address, a sense amplifier SA to amplify and output the voltage outputted to a pair of bit lines BL, /BL from the memory cell MC, and a precharge MOSFET (hereinafter, abbreviated as precharge MOS) QP to precharge the bit lines BL, /BL and sense amplifier to enable the data read operation. This SSRAM is configured so that the precharge MOS QP turns ON when the internal clock ϕi (the clock obtained by introducing the externally supplied clock signal ϕ0 to the internal side via the gated clock circuit 113) is in the low level to perform the precharge, the data is read from the memory cell MC which is selected when the internal clock ϕi becomes high level, and thereafter the internal clock ϕi is reset to the low level when an output of the sense amplifier SA is established. The timing to reset the internal clock ϕi is determined with logical gates G1 to G4 and an output of the sense amplifier SA is held by a latch circuit as the output destination before the internal clock ϕi is reset.

Accordingly, the tag memory 111 and data memory 112 of this embodiment generates power consumption because current flows into the sense amplifier SA and bit lines BL, /BL due to the ON and OFF operations of the precharge MOS QP so long as the internal clock ϕi is supplied even if the address line and word line WL are not selected. This property is general in the memory of the translation look-aside buffer which is required to realize high speed data read operation. For example, such property is also generated when the tag memory 111 and data memory 112 are formed using an associative memory.

Figure 4:
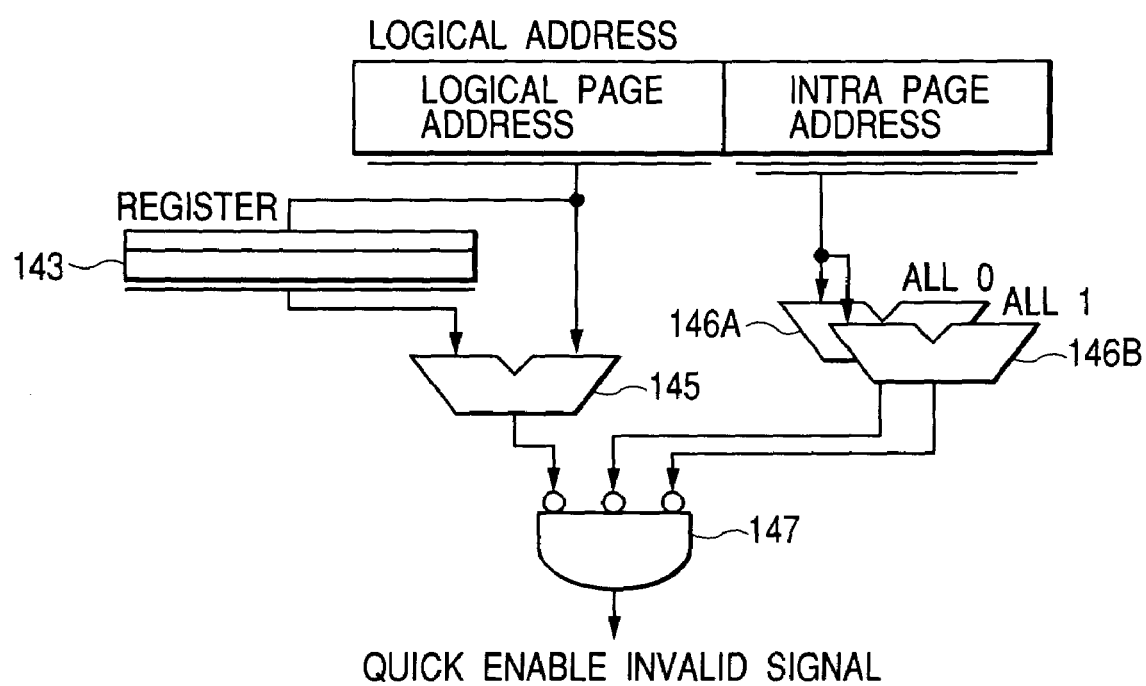
FIG. 4 is a circuit diagram constituting a part of a clock enable generating circuit of FIG. 2.

FIG. 4 illustrates a part of the circuit diagram included in the clock enable generating circuit 140 of FIG. 2.

The clock enable generating circuit 140 of FIG. 2 includes a circuit to generate an invalid signal which invalidates the clock enable signal CE when the input logical page address is same as that of the preceding address conversion and the intra-page address is not included to the boundary portion of address range indicated by the logical page address. As illustrated in FIG. 4, this circuit is comprised of a register 143 to store the logical page address inputted as the preceding input, a comparator 145 to compare an output of the register 143 with the logical page address as the present input, comparators 146A, 146B to compare whether the intra-page address requested as the present access is within the boundary address (for example, all-bit "0" or all-bit "1"), and a logical gate 147 to generate the signal which invalidates the clock enable CE when outputs of these comparators 145, 146A, 146B indicate the conditions described above.

Here, the boundary addresses of the intra-page address are represented by all-bit "0" and all-bit "1". However, for example, when the range of address corresponding to the amount of single data access is set to the lower n-bit of address, such condition may be covered by setting the address range where all bits except for the lower n-bit of the intra-page address become "0" or "1" as the boundary portion.

To the clock enable generating circuit 140, a cache-stall signal and a signal indicating value of valid bit Vs of the status register 150 are inputted and the logic of this circuit is configured to make invalid the clock enable signal CE when the cache-stall signal is in the high level or when the valid bit Vs is "0". Here, the cache-stall signal is used to send, to the external circuit, that cache-miss is judged in the instruction cache 24 and data cache 25 and thereby access to cache becomes impossible because the necessary data is loaded from the main memory.

Figure 5A:
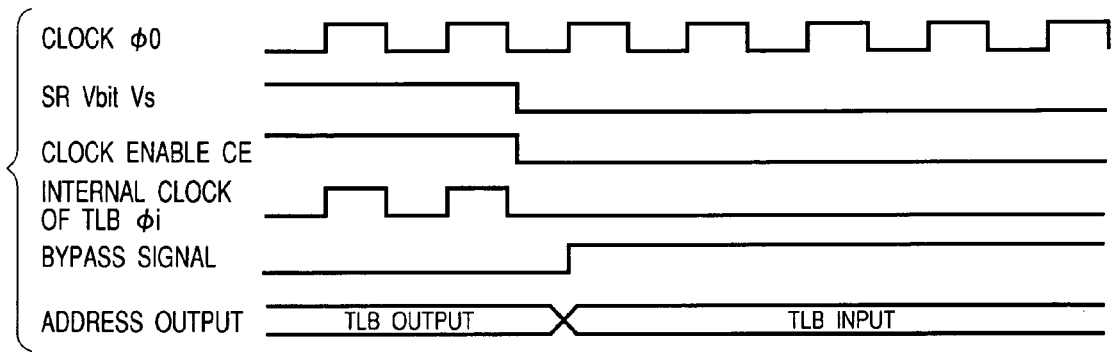
FIG. 5A is a time-chart for explaining the condition that the translation look-aside buffer is dynamically controlled and stopped depending on the value of valid bits of a status register.
Figure 5B:
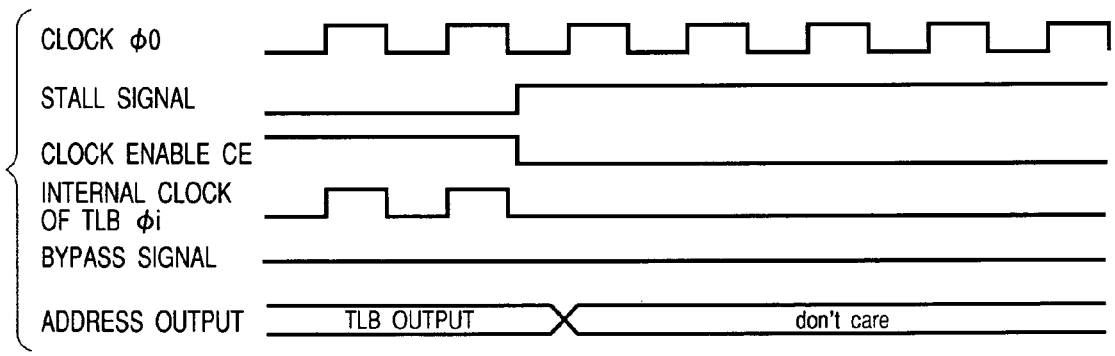
FIG. 5B is a time-chart for explaining the condition that the translation look-aside buffer is dynamically controlled and stopped with a cache-stall signal.
Figure 5C:
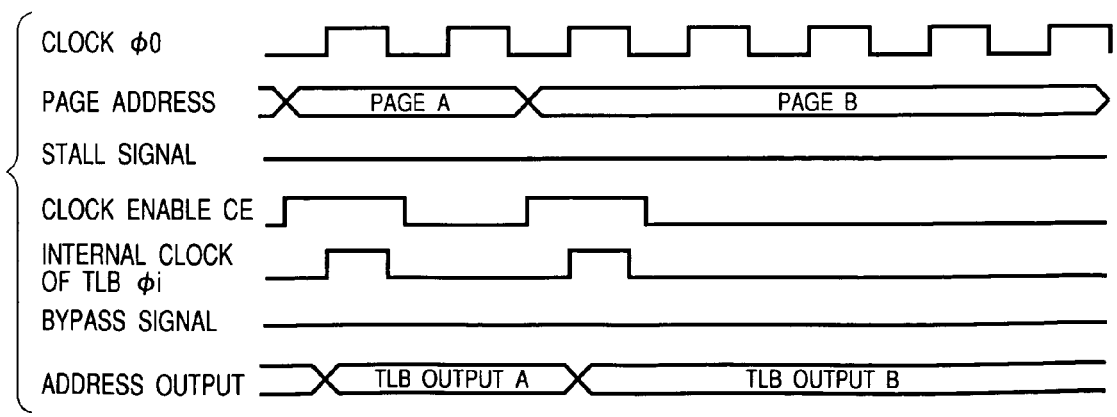
FIG. 5C is a time-chart for explaining the condition that the translation look-aside buffer is dynamically controlled and stopped depending on the address for access to memory.

FIG. 5A to FIG. 5C illustrate the time charts for explaining the conditions where the internal clock φi in the TLB main unit 110 is stopped. FIG. 5A is the time chart for explaining the condition that the translation look-aside buffer is dynamically controlled to stop depending on the value of valid bit Vs of the status register. FIG. 5B is the time chart for explaining the condition that the translation look-aside buffer is dynamically controlled to stop with the cache-stall signal. FIG. 5C is the time chart for explaining the condition that the translation look-aside buffer is dynamically controlled to stop depending on the address of memory access.

In the translation look-aside buffer 100 of this embodiment, the clock enable CE outputted from the clock enable generating circuit 140 is invalidated (set to the low level) under the following three conditions (A) to (C).

The first condition (A) is that the virtual memory valid bit Vs of status register 150 is "0". When the system does not initially use the virtual memory, the virtual memory valid bit Vs becomes "0". In this case, since the virtual memory valid bit Vs is statically set to "0", the clock enable CE is always invalided during operation of the system.

Moreover, when the access is issued to the address other than that in the development area of the virtual memory data in the main memory, the virtual memory valid bit Vs also becomes "0". In this case, since the virtual memory valid bit Vs is updated to "0" from the OS, the clock enable CE is invalided as illustrated in FIG. 5A. In addition, after the virtual memory valid bit Vs is updated to "0", the bypass signal is set to high level at the rising edge of the next clock signal φ0, and thereby the path in the side of the logical address is selected in the bypass circuit 130 and the logical address is outputted as the physical address.

The second condition (B) to invalid the clock enable CE is that the high level cache-stall signal is outputted, because of occurrence of cache-miss, from the cache memory provided between the translation look-aside buffer 100 and the main memory. As illustrated in FIG. 5B, when the cache-stall signal becomes high level, the clock enable CE is invalided and thereby the internal clock φi is stopped.

The third condition (C) is that the signal to invalidate the clock enable CE is issued from the logical gate 147 of FIG. 4. Namely, as illustrated in FIG. 5(C), when the logical page address is used continuously under the condition "A" and thereafter used continuously under the condition "B" switched from the condition "A" (however, when the intra-page address is not in the boundary of the range of page), the clock enable CE is invalided based on the output of the logical gate 147 in the second cycle of the intra-page address in the condition "A" and in the third and subsequent cycles thereof in the condition "B". Accordingly, the translation look-aside buffer 100 respectively outputs the physical page addresses which are converted in the initial cycle where the intra-page address is changed and then stored in the register 120.

However, when the intra-page address is in the boundary of the range of page (for example, all-bit "0" or all-bit "1") even if the same logical page address is continued, the clock enable CE is validated based on output of the logical gate 147 and thereby the TLB main unit 110 operates.

According to the system LSI of this embodiment, as described above, power consumption may be reduced because the internal clock φi of the TLB main unit 110 is stopped when the logical page address conversion by the translation look-aside buffer 100 is unnecessary.

Moreover, when it is requested that the internal clock φi is stopped under the condition that the logical page address is identical to the preceding one, such request is controlled except for the case where the intra-page address is in the boundary area of the address range. Accordingly, the translation look-aside buffer 100 is not stopped even when the access is continuously issued over the two logical page addresses including such boundary area. As a result, it may be avoided that the memory access process temporarily stops and gives influence on the processing rate of system.

When the virtual memory is not used completely, it is also possible that power consumption due to the leak current is reduced by isolating the translation look-aside buffer 100 from the internal power source. In more practical, the virtual memory valid bit Vs of the status register 150 is read under the fixed low level condition and the TLB main unit 110 and the power source are isolated from the switch MOSFET. Moreover, a tristate buffer is provided at the output of TLB main unit 110 to control so that a through-current does not flow between the input and output of TLB main unit 110. In addition, two kinds of product comprising and not comprising the virtual memory can be produced with the semiconductor device fabrication process using the same kind of mask by providing the structure to change over the condition described above and the condition using the virtual memory with the bonding option or the like.

The present invention is never limited to the above embodiment and allows various changes and modifications not departing the scope of the claims thereof.

For example, in above embodiment, the cache-stall signal is used to control the internal clock φi to stop in order to stop the internal clock φi of the TLB main unit 110 during the period where no access is issued to the cache memory. However, it is also possible to stop the internal clock φi based on a detection signal by detecting, without use of the cache-stall signal, that there is no memory access request from detection of various conditions.

In above description, the present invention has been mainly described referring to the example of a system LSI comprising a processor which is considered as the application field as the technical background thereof. However, the present invention is not limited thereto and may be used widely into the discrete processors loading an address conversion table and semiconductor integrated circuits such as MMU (Memory Management Unit).

[Second Embodiment]

Next, a structure to reduce power consumption of the instruction decoder 22 and execution unit 23 of the processor core 20 of FIG. 1 will be described.

As described above, the processor core 20 of this embodiment has been configured to eliminate the NOP instruction from the instruction of VLIW system and inputs the compressed instruction including additional location information to perform expansion and execution.

Figure 6:
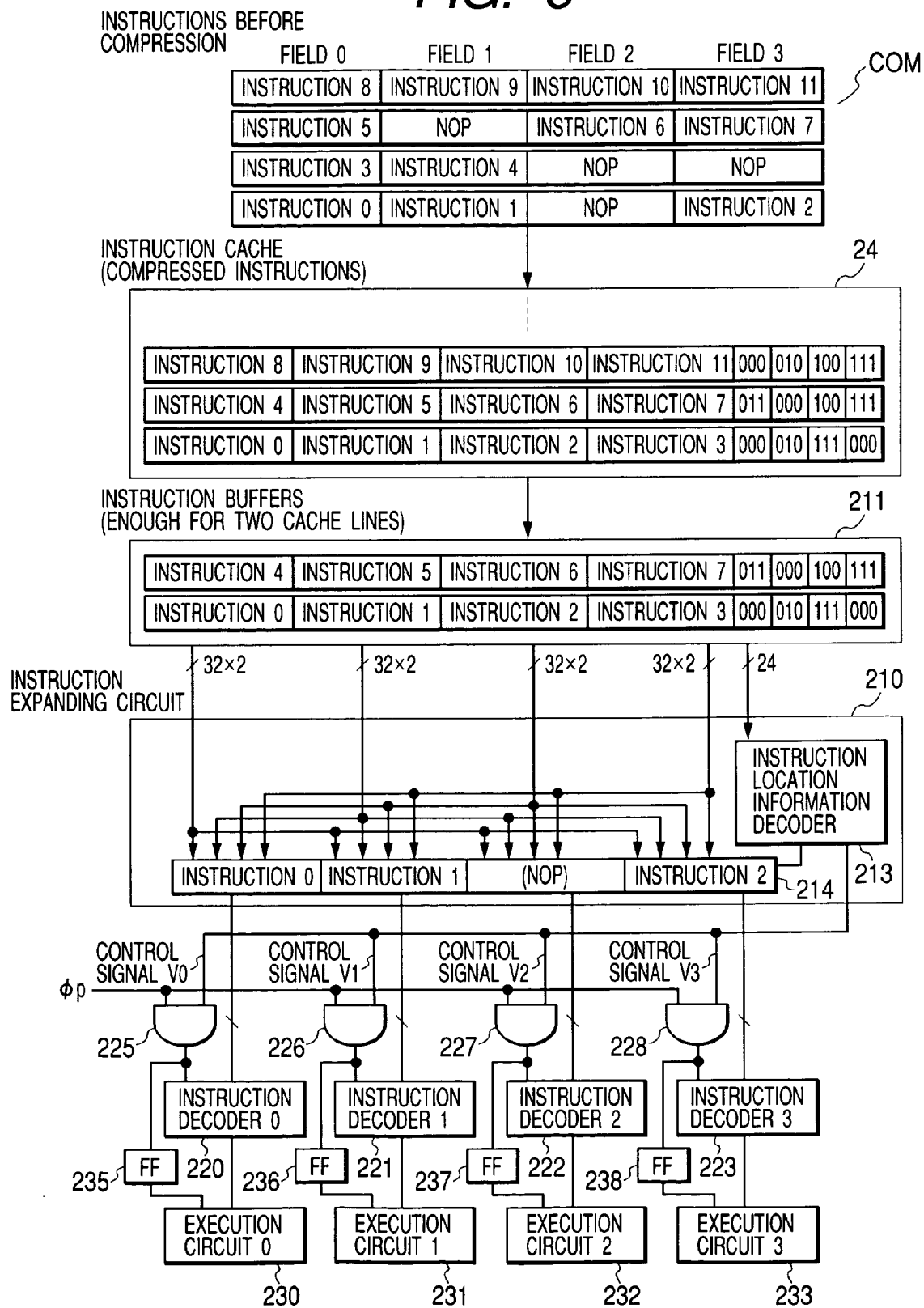
FIG. 6 illustrates the process to execute instructions with the processor core of FIG. 1.

FIG. 6 is a diagram for explaining the process to execute the instruction with the processor core 20.

The execution unit 23 of processor core 20 is provided with a plurality of execution circuits 230 to 233 to simultaneously process in parallel a plurality of instruction codes included in each instruction of the VLIW instructions. The execution circuits 230 to 233 include the circuit for different processes of the instructions such as memory access instruction and arithmetic instruction. Therefore, a plurality of instruction codes included in one instruction must be set in the predetermined arrangement.

The instruction decoder 22 provided in the preceding stage of the execution unit 23 is also provided with a plurality of decoding circuits 220 to 223 in order to simultaneously decode a plurality of instruction codes.

In the preceding stage of instruction decoder 22, an instruction unit 21 comprising an instruction expanding circuit 210 and an instruction buffer 211 or the like. Therefore, the compressed instruction is expanded in the relevant instruction unit 21.

The instruction expanding circuit 210 is provided with a development buffer 214 including a plurality of storing areas to store a plurality of instruction codes included in one instruction through development of a non-compressed VLIW instruction and an instruction location information decoder 213 for decoding the instruction location information enough for two instructions stored in the instruction buffer 211 in the preceding stage and developing, to the development buffer 214, the instruction codes of the same group processed simultaneously among a plurality of instruction codes included in these two instructions. The development buffer 214 is provided with a selector for selectively fetching a plurality of instruction codes stored in the instruction buffer 211 and is also configured to respectively latch any instruction code with the decode signal from the instruction location information decoder 213.

Next, the practical structure to non-actively control the instruction decoder 22 and execution unit 23 will be described.

Operation clocks φp are inputted to a plurality of decode circuits 220 to 223 described above via the gated clock circuits 225 to 228. To one input terminal of each gated clock circuit 225 to 228, the control signals V0 to V3 are inputted from the instruction location information decoder 213. These control signals can individually stop the operation clocks φp of the decode circuits 220 to 223.

Moreover, to the execution circuits 230 to 233, the operation clocks φp are inputted via the gated clock circuits 225 to 228 and flip-flop circuits 235 to 238. Namely, the clock signals outputted from the gated clock circuits 225 to 228 are supplied with delay of one cycle to the execution circuits 230 to 233 via the flip-flop circuits 235 to 238.

The instruction location information decoder 213 has the function, in addition to the function to expand the instruction described above, as the control means to set up the non-active state by stopping the operation clocks φp of these decode circuits 220 to 223 and execution circuits 230 to 233. When the location where the NOP instruction is eliminated from the instruction location information is detected in this instruction location information decoder 213, the control signal for stopping the clock is outputted to any one of the gated clock circuits 225 to 228 corresponding to the detected location where the NOP instruction is eliminated in the processing cycle in which the VLIW instruction of this group is decoded in the instruction decoder 22.

Next, the processing operations of the compressed instruction by the processor 20 configured as described above will be described below.

As illustrated in the compressed instruction COM of FIG. 6, in one VLIW instruction, a plurality of (for example, four) instruction codes to be executed simultaneously before compression are arranged in a plurality of fields. One instruction code has the length, for example, of 32 bits. When the instruction codes to be executed simultaneously are less than the predetermined number of codes, the instruction length is adjusted by inserting the NOP instruction which is not processed effectively into the field where there is no instruction codes.

Figure 7:
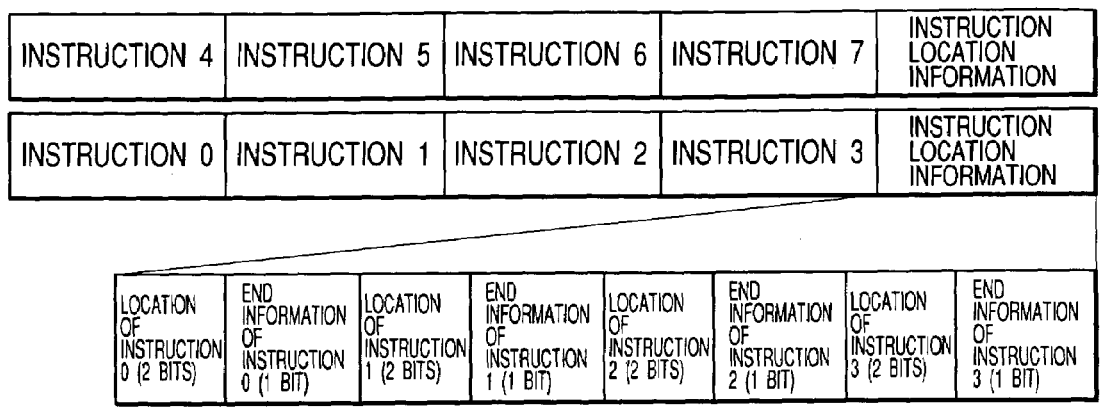
FIG. 7 illustrates a data format of the compressed instruction of VLIW system.

FIG. 7 illustrates data format of a compressed instruction.

The compressed information has the data format where the effective instruction codes are summarized by cramming such codes in the sequence of arrangement and by eliminating the NOP instruction and the instruction location information indicating the boundary of instruction codes of the same group to be processed simultaneously and the location of each instruction code is added at the final area of one compressed instruction. The instruction location information is the 12-bit data wherein the 3-bit data consisting of location information of 2-bit indicating "field 0 to field 3" and END information of 1-bit indicating the final area of one instruction are arranged respectively corresponding to the four instruction codes included in one compressed instruction. In this compression system, the compression rate becomes larger when the insertion rate of the NOP instruction becomes so far large because one instruction code length of the VLIW instruction becomes longer or the number of instruction codes included in one instruction increases.

Such compression of the VLIW instructions is executed, for example, at the time of program compilation and the compressed instructions are stored in the main memory or the like and then loaded in direct to the I cache 24.

When the compressed instruction is loaded to the I cache 24, the process to expand the compressed instruction is executed next in the instruction unit 21. The expanding process is attained by reading, first, two compressed instructions in the sequence of arrangement to the instruction buffer 211 from the I cache 24, decoding, next, the instruction location information of these two compressed instructions with the instruction location information decoder 213, and then storing a plurality of instruction codes of the same group to be processed simultaneously with the decode signal to each area of the development buffer 214 in the format depending on the location information of the instruction code. Here, the area where the NOP instruction is inserted before the compression process is still storing the preceding instruction code.

In addition, during the decode process by the instruction location information decoder 213, the control signals corresponding to the field where the instruction code is not newly arranged (namely, the field where the NOP instruction has been inserted before the compression process) among the control signals V0 to V3 inputted to the gated clock circuits 225 to 228 are set to become low level in the next cycle.

Next, a plurality of instruction codes developed in the development buffer 214 are sent to each decode circuit 220 to 223 of the instruction decoder 22 and are then decoded respectively. However, since the operation clock φp is not supplied to the decode circuit corresponding to the area where the NOP instruction has been inserted before the compression process due to control by the gated clock circuits 225 to 228, the decode process is never performed.

When the instruction decode process is executed, the result of decode is then sent to the corresponding execution circuits 230 to 233 for execution of the instruction. However, since the operation clock φp is not supplied, in the execution cycle, to the execution circuit corresponding to the area where the NOP instruction has been inserted before the compression process, due to the control of the gated clock circuits 225 to 228 and delay of signal in the flip-flop circuits 235 to 238, the execution process is not performed.

Upon execution process, the result is written to the D cache 25 or to the predetermined register and execution of one instruction is completed.

Figure 8:
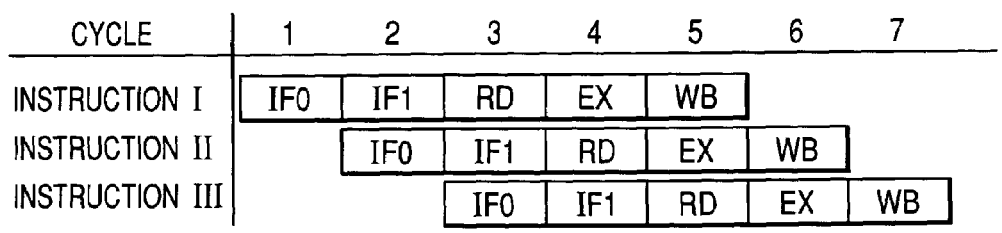
FIG. 8 illustrates contents of pipeline process of processor core of FIG. 1.

FIG. 8 illustrates contents of the pipeline process by the processor core 20.

As illustrated in this figure, the instruction fetch "IF0" to the instruction buffer 211 described above, process "IF1" to develop the compressed instruction to the development buffer 214 by expanding the same, instruction code by the instruction decoder 22 (including the data read operation required for execution) "RD", instruction execution "EX" and write process of result "WB" are respectively one processing stage of the pipeline process. Therefore, the stop control of the operation clock φp performed by the instruction location information decoder 213, gated clock circuits 225 to 228 and flip-flop circuits 235 to 238 is placed under the timing control to become effective in the cycle where the detected instructions at the area where the NOP instruction has been inserted are shifted for the execution to the decode circuits 220 to 223 and execution circuits 230 to 233.

As described above, according to the system LSI of this embodiment, when one instruction of the VLIW instructions includes the area where the NOP instruction has been inserted, since the operation clock φp is no longer supplied to the decode circuits 220 to 223 and execution circuits 230 to 238 for decoding and execution of such instruction codes, power consumption which has been generated by the decoding and execution of the NOP instruction can be reduced.

In addition, since it is no longer required to recover the NOP instruction at the time of expanding the compressed instruction for the area where the NOP instruction has been included before the compression process, power consumption required for such recovery process can also be reduced by saving the structure to recover the NOP instruction.

Furthermore, the detection process to stop or not the decode circuits 220 to 223 and execution circuits 230 to 233 and the process to detect the field to be stopped are performed in the expanding process in parallel to the decode process of the instruction location information. Accordingly, such detection processes do not result in the disadvantage that the processing speed characteristic is deteriorated.

Here, the power consumption reduction effect which may be attained by stopping the decode process and execution process of the NOP instruction will be first described quantitatively.

Figure 9:
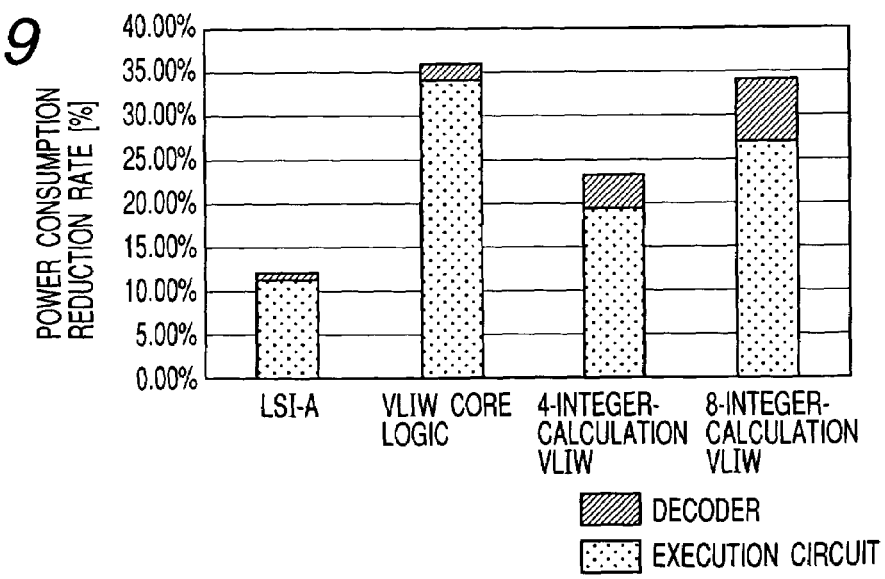
FIG. 9 is a graph indicating the reduction rate of power consumption which is attained by stoppage of process in relation to the NOP instruction.

FIG. 9 is a graph indicating the power consumption reduction rate which may be attained by stopping the decode and execution of the NOP instruction.

In this figure, the graph of "LSI-A" indicates the power consumption reduction rate of the system LSI including the peripheral modules and many peripheral logics in addition to the processor core 20 of the VLIW system, while the graph of "VLIW core logic" indicates the power consumption reduction rate of only the processor core 20. Moreover, the graph of "4-integer-arithmetic VLIW" indicates the power consumption reduction rate of the processor core of VLIW system to perform in parallel the four arithmetic calculations of integer, while the graph of "8-integer-arithmetic VLIW" indicates the power consumption reduction rate of the processor core of VLIW system to perform in parallel the eight arithmetic calculations of integer.

Moreover, as the conditions for calculating the power consumption reduction rate, the total number of transistors to form the system LSI of the "LSI-A" is set to about 14,900,000, the number of transistors to form the instruction decoder 22 is set to about 200,000, while the number of transistors to form the execution unit 23 is set to about 3,300,000. In addition, the video decode process is considered as the object of the program process to be executed, and the number of NOP instruction codes included in one instruction is set to 1.99 not considering a loop or the like, while the number of effective instruction codes is set to 2.01.

Under these conditions, when the decode and execution of the NOP instruction are stopped as in the case of this embodiment, it has been proved that remarkable power consumption effect can be obtained. Namely, the power consumption reduction rate of the processor core 20 by stopping the operation of execution circuit is 34.3%, while it is 2.2% by stopping the operation of decode circuit.

Moreover, the system LSI of "LSI-A" provides a small power consumption reduction rate because the power consumption of the peripheral module and peripheral logic does not change, but it has also attained the result of power saving of 11.2% by stopping the operation of execution circuit and 0.7% by stopping the operation of decode circuit. Moreover, it has also been proved that remarkable power saving effect as illustrated in the graph can be attained even for the processor core of "4-integer-arithmetic VLIW" and "8-integer-arithmetic VLIW".

Next, there is described the contents of discussion for influence on the processing speed of the processor with detection of the insertion area of the NOP instruction by comparing the structure of this embodiment with the structure for stopping the decode process and execution process of the NOP instruction by detecting the NOP instruction after the expanding process.

Figure 10A:
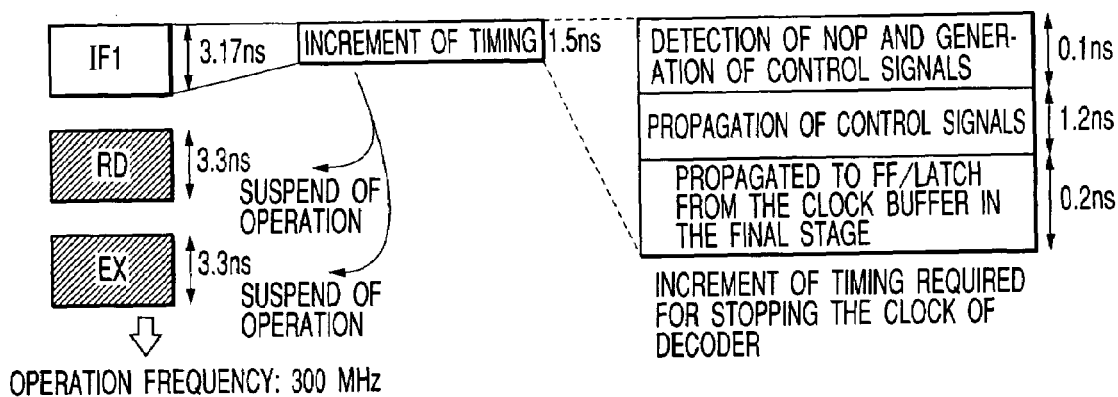
FIG. 10A is a diagram for explaining influence applied to the operation frequency of processor by the control to suspend the operations of decoding circuit and execution circuit in the processor core of the embodiment.
Figure 10B:
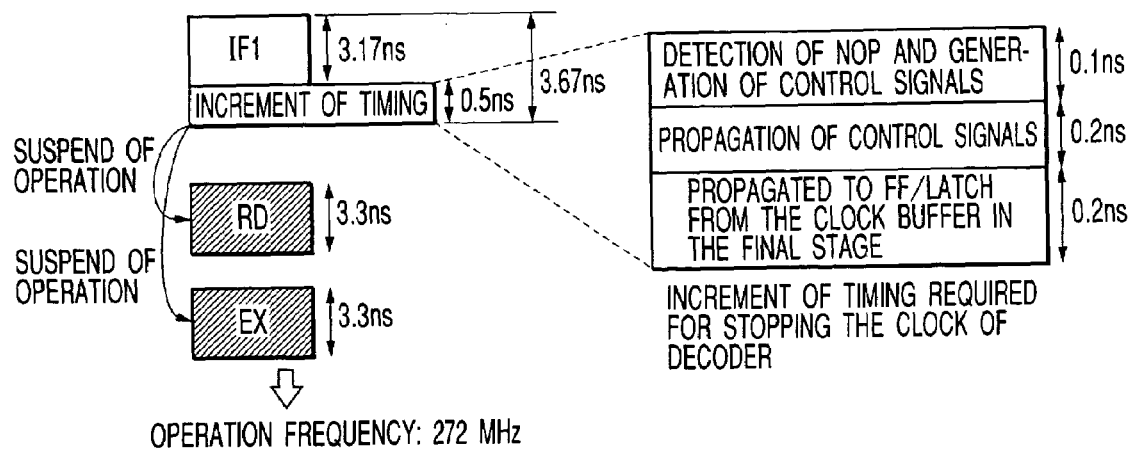
FIG. 10B is a diagram for explaining influence applied to the operation frequency of processor by the control to suspend the operations of decoding circuit and execution circuit in the comparison example to detect the NOP instruction after the expansion process.

FIG. 10A and FIG. 10B illustrate influence on the operation frequency of the processor by detection of the area where the NOP instruction is inserted. FIG. 10A corresponds to this embodiment, while FIG. 10B corresponds to the case where the NOP instruction is detected after the expanding process.

The part having the critical path in each operation stage of the processor core 20 is in general the decode stage (RD) and execution stage (EX) and small allowable time is generated in the process of the instruction expanding stage (IF1).

In regard to the practical time duration of a conventional product to which the present invention is to be applied, the time duration required for the process of the instruction expanding stage (IF1) is 3.17 ns, while that required for the process of the decode stage (RD) and execution stage (EX) is 3.3 ns, respectively. The maximum operation frequency of this product is 300 MHz.

When the present invention is adapted to this product without change of principal circuit configuration, as illustrated in FIG. 10A, the time required for outputting the control signal by detecting the NOP instruction location from the instruction location information can be roughly calculated as 0.1 ns, while the time required for propagating the control signal to the gated clock circuits 225 to 228 to supply the operation clock φp to the decode circuits 220 to 223 as 1.2 ns and the time required for propagating the clock signal to the flip-flop circuit for data latch provided in the input stage of the decode circuits 220 to 223 from the gated clock circuits 225 to 228 as 0.2 ns. Namely, increment of timing required for stopping the decode circuits 220 to 223 from detection of the NOP instruction location becomes 1.5 ns.

However, since these processes may be executed in parallel to the expansion of compressed instruction, increment of timing of 1.5 ns may be included within the processing time of the instruction extension stage (IF1), giving no influence to the processing speed of processor.

Meanwhile, in the system for detecting the NOP instruction after expansion of compressed instruction, even when it is roughly calculated that the total increment of timing is 0.5 ns under the preconditions that 0.1 ns is required to output the control signal from detection of the NOP instruction, 0.2 ns to propagate the control signal to the clock buffer, and 0.2 ns to propagate the control signal to the input flip-flop circuit of the decode circuits 220 to 223 from the clock buffer, since these processes must be executed after expansion of compressed signal, the increment of timing of 0.5 ns is added to the processing time of the instruction expansion stage (IF1) and therefore the time duration required for process in the instruction expansion stage (IF1) becomes 3.67 ns. This time duration is longer than the processing time of the decode stage (RD) and execution stage (EX). Accordingly, increment of timing gives influence on the processing speed of processor and thereby the maximum operation frequency is deteriorated, for example, to 272 MHz.

Since it can be thought in future that the processing time of the instruction expansion stage (IF1) and that of the decode stage (RD) and execution stage (EX) are shortened and difference of these processing times may be reduced by reduction of signal propagation time due to the changes of wiring materials and improvement in the operation rate of transistor due to the ultra-miniaturization of semiconductor process, such increment of timing will give larger influence on the processing speed of processor.

The prevent invention has been described practically based on the preferred embodiments thereof but the present invention is never limited only to such embodiments and naturally allows various changes and modifications only within the scope of the claims thereof.

For example, the embodiments described above are configured not to recover the NOP instruction for the field where the NOP instruction has been inserted, but it is also possible to recover the NOP instruction at the insertion area of the NOP instruction with the decode signal from the instruction location information decoder 213 by providing the circuit to the development buffer 214 to generate the instruction codes of the NOP instruction.

Moreover, the area where the NOP instruction has been inserted in the compressed instruction is not limited only to the configuration to store the preceding instruction codes and may be configured to insert the desired value.

In addition, the embodiments described above are based on the structure for parallel arithmetic operations of four instruction codes but these are not limited only to the four instruction codes and the present invention can realize low power consumption by stopping the decode process and execution process of the NOP instruction even when the number of instruction codes is larger or smaller than a plurality of codes described above.

Moreover, although not particularly described, the gated clock circuits 225 to 228 and flip-flop circuits 235 to 238 are arranged within the processor core 20.

Furthermore, these embodiments described above are based on the structure that the decode and execution are executed after the compressed instruction having eliminated the NOP instruction has been expanded, but it is also possible even for the processor which executes the non-compressed VLIW instruction to which the NOP instruction is inserted to realize low power consumption by stopping the decode process and execution process of the NOP instruction without drop of the operation frequency. Namely, the present invention is configured to add the process stage to prefetch the instruction as a stage of the pipeline process of the processor and to detect the NOP instruction in the prefetch process stage in order to suspend the operations of the decoder circuit and execution circuit when the NOP instruction is detected as a result of such detecting operation. With the configuration described above, one process stage increases in the pipeline processing stages but low power consumption may be realized by suspending the operations of the decode process and execution process of the NOP instruction without giving any influence on the operation frequency of processor.

The present invention has been described considering the system LSI having loaded the processor in the application field as the technical background thereof. However, the present invention is never limited to such system LSI and can also be widely used into the semiconductor integrated circuits of the discrete processor.

The effects of the typical inventions disclosed in the present invention may be briefly described as follows.

Namely, according to the present invention, power consumption in the address conversion table may be reduced without giving any influence on the processing rate.

Moreover, according to the present invention, power consumption of the processes related to the NOP instruction can be reduced without influence on the processing rate of the processor of VLIW system.

What is claimed is:

1. A semiconductor integrated circuit, comprising:
    an address conversion memory circuit for converting a logical address of a vertical memory into a physical address of a main memory,
    wherein the address conversion memory circuit comprises a gated logic circuit, a clock enable generating circuit, a tag memory and a data memory,
    wherein clocks are supplied to the tag memory and the data memory via the gated logic supplies and cuts off the clocks,
    wherein the tag memory stores the logical page address as tag information,
    wherein the data memory stores the physical page address as entry information, wherein the clock enable generating circuit invalidates a clock enable signal when a first logical page address requested as a preceding access is the same as a second logical page address requested as a present access and a first intra-page address requested as the present access is not within the boundary addresses between intra-page addresses, and wherein the gated logic circuit cuts off the clock to the tag memory and the data memory when the clock enable signal is valid.

2. A semiconductor integrated circuit according to claim 1, wherein the address conversion memory circuit further comprises a status register which stores a valid bit indicating whether or not to use the virtual memory, and wherein the clock enable generating circuit invalidates the clock enable signal when the valid bit being invalid.

3. A semiconductor integrated circuit according to claim 1, further comprising:

an instruction cache for reading instructions; and a data cache for reading and writing data, wherein the clock enable generating circuit invalidates the clock enable signal when the clock enable generating circuit receives a cache stall-signal indicating that cache-miss occurs in the instruction cache and the data cache.

4. The semiconductor integrated circuit according to claim 1, wherein the boundary area is an address range in which all bits are 0 or 1 the infra-page addresses.

5. The semiconductor integrated circuit according to claim 1, wherein the boundary area is an address range in which all bits are 0 or 1 except for the lower n-bit of the infra-page addresses.

6. The semiconductor integrated circuit according to claim 1, wherein the tag memory and the data memory comprises a memory cell, a sense amplifier and a precharge MOSFET, wherein the sense amplifier amplifies and outputs a voltage outputted to a pair of bit lines from the memory cell, wherein the bit lines are precharged via the precharged MOSFET, and wherein the clocks switch the precharged MOSFET.

7. The semiconductor integrated circuit according to claim 1, wherein the clock enable generating circuit comprises a first comparator, a second comparator, a register and a logical gate, wherein the register stores the second logical page address, wherein the first comparator compares the first logical page and the second logical page, wherein the second comparator compares the whether a first intra-page address requested is not within the boundary addresses between intra-page addresses, and wherein the logical gate generates a clock enable signal on the basis of outputs of the first comparator and the second comparator.

8. A semiconductor integrated circuit, comprising:

a processor executing compressed instructions of VLIW instruction in which a plurality of instruction codes are arranged in a plurality of fields, wherein the compressed instructions comprise effective instruction codes except codes of NOP instructions and instruction location information indicating locations of the plurality of instruction codes, wherein the processor comprises an instruction cache, an instruction unit, an instruction decoder, an execution unit and a plurality of gated clock circuits, wherein the instruction unit comprises an instruction location information decoder, wherein the instruction decoder comprises a plurality of decode circuits in order to simultaneously decode the plurality of instruction codes, wherein the execution unit comprises a plurality of execution circuits to simultaneously process in parallel the plurality of instruction codes, wherein operational clocks are inputted to the plurality of decode circuits and the plurality of execution circuits via the gated clock circuits, and wherein the instruction location information decoder outputs control signals to stop the operation clock to the gated clock circuits corresponding to the fields, where the NOP instructions are inserted before the plurality of instruction codes are compressed, on the basis of the instruction location information.

9. A semiconductor integrated circuit according to claim 8, wherein the instruction unit further comprises a development buffer, wherein the development buffer stores the plurality of instruction codes in the plurality of fields on the basis of the instruction location information, and wherein the development buffer still stores preceding instruction codes in the fields, where the NOP instructions are inserted on basis of the instruction location information before the plurality of instruction codes are compressed, on the basis of the instruction location information.

* * * * *